US008762827B2

(12) United States Patent
Spradley et al.

(10) Patent No.: US 8,762,827 B2
(45) Date of Patent: Jun. 24, 2014

(54) TECHNIQUES FOR CREATING DOCUMENTATION

(75) Inventors: Dana Spradley, Seattle, WA (US); Ultan O'Broin, Dublin (IE); Linda Garido, legal representative, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 12/820,609

(22) Filed: Jun. 22, 2010

(65) Prior Publication Data

US 2010/0332971 A1    Dec. 30, 2010

Related U.S. Application Data

(60) Provisional application No. 61/221,403, filed on Jun. 29, 2009.

(51) Int. Cl.
*G06F 17/00*    (2006.01)

(52) U.S. Cl.
USPC ........... 715/208; 715/230; 715/235; 715/236; 715/254; 715/272; 715/277; 715/712; 715/763; 434/350

(58) Field of Classification Search
USPC ......... 715/230, 208, 235, 236, 254, 272, 277, 715/712, 763; 434/350
See application file for complete search history.

(56) References Cited

U.S. PATENT DOCUMENTS

| | | | |
|---|---|---|---|
| 7,599,899 B2 | 10/2009 | Rehberg et al. | |
| 2004/0076941 A1* | 4/2004 | Cunningham et al. | 434/350 |
| 2005/0097449 A1* | 5/2005 | Lumera et al. | 715/511 |
| 2006/0053382 A1* | 3/2006 | Gardner et al. | 715/764 |
| 2007/0166684 A1 | 7/2007 | Walker | |
| 2008/0163043 A1* | 7/2008 | van Eikeren et al. | 715/255 |

OTHER PUBLICATIONS

Alexander, Christopher, *A Pattern Language: Towns, Buildings, Construction* (1977).
Anonymous, "Information Mapping," http://en.wikipedia.org/wiki/Information_mapping 2 pp., accessed Apr. 3, 2009.
Graham, Ian, *A Pattern Language for Web Usability* (2003).
Hennum, et al., "Design Patterns for Information Architecture with DITA Map Domains: Defining a Type for Collections of Topics," http://www.ibm.com/developerworks/xml/library/x-dita7/, 9pp., accessed Apr. 3, 2009.

(Continued)

*Primary Examiner* — Quoc A Tran
(74) *Attorney, Agent, or Firm* — Kilpatrick Townsend & Stockton LLP

(57) ABSTRACT

Techniques for creating documentation. A writing pattern is provided. The writing pattern may be implemented in a schema, such as an XML schema or DTD. The writing pattern includes a plurality of components and defines structure and style for the documentation. Each component corresponds to a portion of the documentation. A selection of one of the components is received. Content for the selected component is received. The documentation is formed based on the content and structure and style the style.

20 Claims, 4 Drawing Sheets

(56) References Cited

OTHER PUBLICATIONS

Hughes, Mike, "A Pattern Language for User Assistance," http://www.cs.kent.ac.uk/people/staff/saf/patterns/gallery/p27-hughes.pdf, 3 pp., accessed Apr. 3, 2009 (2007).

Nielsen, Jacob, "How Little Do Users Read?" http://www.useit.com/alertbox/percent-text-read.html, 5pp., accessed Apr. 3, 2009 (2008).

Nielsen, Jakob, "Be Succinct! Writing for the Web," http://www.useit.com/alertbox/9703b.html, 2pp., accessed Apr. 3, 2009 (1997).

Nielsen, Jacob, "Writing Style for Print vs. Web," http://www.useit.com/alertbox/print-vs-online-content.html 4pp., accessed Apr. 3, 2009 (2008).

Van Duyne et al., *The Design of Sites: Patterns for Creating Winning Web Sites* (2006).

Yahoo, Inc., "Yahoo! Design Pattern Library," http://developer.yahoo.com/ypatterns/, 2 pp., accessed Apr. 3, 2009 (2008).

\* cited by examiner

TECHNIQUES FOR CREATING DOCUMENTATION

CROSS-REFERENCES TO RELATED APPLICATIONS

This application claims the benefit of provisional application No. 61/221,403, filed on Jun. 29, 2009, the full disclosure of which is incorporated herein by reference.

BACKGROUND OF THE INVENTION

One of the chief complaints among software users is the lack of consistent product documentation that directly and clearly addresses user problems and questions. Often, product documentation is presented with inconsistent structure and styles, is not integrated into a user's overall experience with a product (for example, the documentation does not consider what is already obvious because of the user interface design or other information shown in messages), and focuses on describing what a user sees in the user interface rather than why or how that information is derived so that the user can act on it. For example, product documentation is more likely to describe the physical appearance and axes of a graph on a page than to explain how the financial information in that graph was calculated.

One reason that product documentation sometimes is ineffective has partly to do with the fact that technical writers often do not have easy access to the same innovative design methodologies and architectures that are used by software engineers and user interface designers. Technical writers rely instead on corporate-wide or industry-standard style guides that are geared toward applying correct English grammar, style, and usage. The Chicago Manual of Style is an example of such a style guide. However, these style guides do not address how best to organize and structure documentation from the point of view of the user experience of the product. Style guides generally assume that documentation is organized into traditional computer manual types, such as user guides, administrator guides, and implementation guides. Because of their broad audience, these style guides also fail to consider the specific tools that technical writers must use to create the documentation, such as Microsoft Word, PTC Arbortext® Editor, or Adobe Framemaker. Thus, technical writers are forced to loosely interpret these generic style guides and imitate the inconsistently applied practices of their peers.

BRIEF SUMMARY OF THE INVENTION

Embodiments of the present invention provide techniques for creating documentation. In accordance with an embodiment, a computer-implemented method of creating documentation includes providing a writing pattern. For instance, an authoring tool that automates the capture of information and the formation of documentation from the information may provide the writing pattern to a writer using a user interface. In an embodiment, the writing pattern has a content aspect and a structural aspect and a style aspect which enables the authoring tool to automate the process of information capture and documentation creation. For example, in an embodiment, the writing pattern comprises a plurality of components. The writing pattern may also define the placement of different portions of content within the documentation relative to one another, and thus the overall structure of the documentation's discourse. Each component corresponds to a portion of the documentation, such as a specific type of information that a writer should author for the component. The writing pattern may also define style for the documentation. For instance, the writing pattern may define fonts, font size, text alignment, and the like. Accordingly, a selection of one of the components of the writing pattern is received as well as content for the component. The documentation is formed according to the content, structure and the style specified by the writing pattern. In this manner, the writing pattern ensures that essential information is captured and formed into suitable documentation.

In an embodiment, the documentation includes an element of a markup language including the content for each component for which content has been received from the writer. Other variations are also possible. For example, the method may include providing the writer an indication of how to author the content for each component of the selected writing pattern and/or designating at least one component of the selected writing pattern as requiring content. Further, whether the writer has entered content for all components designated as requiring content may be validated. As another example, documentation may first be created in a first format and then converted into a document of another format. Also, writing patterns may share components such that one component may be used in more than one writing pattern.

In accordance with another embodiment, a computer-readable storage medium having stored thereon instructions for causing a processor to perform a method of creating documentation is included. The computer readable medium includes instructions for providing a writing pattern, instructions for receiving a selection of one of said components, instructions for receiving content for said one of said components, and instructions for forming said documentation based on said structure, said style and/or said content. The writing pattern comprises a plurality of components and defines style for the documentation and each component corresponds to a portion of the documentation.

In addition, the documentation may include an element of a markup language including the content for each component for which content has been received from the writer. The computer readable medium may also include instructions for providing the writer an indication how to author the content for each component. Instructions for designating at least one component as requiring content may also be included, as well as instructions for validating whether the writer has entered content for all components designated as requiring content. The documentation may be created in a first format and the instructions may include instructions for converting the documentation to another format. As with the embodiment noted above, writing patterns may share common components.

In accordance with yet another embodiment, a system for creating documentation is provided. The system includes a memory storage device adapted to store a writing pattern, said writing pattern comprising a plurality of components and defining style for said documentation, each component corresponding to a portion of said documentation. Each component corresponds to a portion of the documentation and the processor is adapted to receive via said at least one input device a selection from the writer indicating a selected writing pattern of said plurality of writing patterns, to receive content from the writer for at least one of said components of the selected writing pattern; and to compile the content into a document.

The system may include, for each component for which content has been received from the writer, an element of a markup language including the content. Also, the processor may be further adapted to provide an indication to the writer how to author the content for each component having content received from the writer and/or to designate at least one component of the selected writing pattern as requiring content and to validate whether all components designated as requiring content include content from the writer and/or to compile the content into the documentation in a first format and to convert the documentation in the first format to a second format. A plurality of writing patterns may utilize common components.

In accordance with yet another embodiment of the invention, a computer-implemented method of creating product documentation is disclosed. The method includes storing in a data store a plurality of document schemas, each of the document schema corresponding to a topic and comprising a plurality of elements. The method also includes, for each document of a plurality of documents, receiving user selection of an element of a corresponding document schema, receiving user input representative of content for the selected element, and adding information corresponding to the user input to the document according to the corresponding document schema. Information from the plurality of documents is associated together in a document collection related to the product.

The method may also include, for each of the plurality of documents, creating another document that includes the content organized according to the corresponding document schema. Associating the information may include associating said another documents together. The method may also include upon receiving the user selection of the element, providing the user an indication corresponding to the element of how to author the content. In one embodiment, the method includes designating at least one of the plurality of elements as required and validating whether content has been entered for said at least one element. At least two of the schemas may share a common element. Also, at least two of the plurality of documents may correspond to the same document schema.

In accordance with another embodiment, a computer-readable storage medium having stored thereon instructions that cause one or more processors to create documentation is disclosed. The instructions may include instructions that cause the one or more processors to store in a data store a plurality of document schemas, each of the document schema corresponding to a topic and comprising a plurality of elements; instructions that cause the one or more processors to, for each document of a plurality of documents, receive user selection of an element of a corresponding document schema, receive user input representative of content for the selected element, add information corresponding to the user input to the document according to the corresponding document schema. The instructions may also include instructions that cause the one or more processors to associate information from the plurality of documents together in a document collection.

In one embodiment, the instructions further comprise instructions that cause the one or more processors to, for each of the plurality of documents, create another document that includes the content organized according to the corresponding document schema. The instructions that cause the one or more processors to associate the information may include instructions that cause the one or more processors to associate said another documents together. Also, the instructions may further include instructions that cause the one or more processors to, upon receiving the user selection of the element, provide the user an indication corresponding to the element of how to author the content, instructions that cause the one or more processors to designate at least one of the plurality of elements as required, and/or instructions that cause the one or more processors to validate whether content has been entered for said at least one element. The document schemas are schemas of a markup language. The instructions that cause the one or more processors to associate the information may include instructions that cause the one or more processors to collect a plurality of hyperlinks to corresponding documents of the document collection. At least two of the schemas may share a common element and at least two of the plurality of documents may correspond to the same document schema.

In accordance with yet another embodiment, a system for creating documentation is disclosed. The system includes a memory storage device operable to store in a data store a plurality of document schemas where each of the document schemas correspond to a topic and comprise a plurality of elements. The system also includes at least one input device and at least one processor operable to, for each document of a plurality of documents, receive user selection of an element of a corresponding document schema, receive user input representative of content for the selected element, and information corresponding to the user input to the document according to the corresponding document schema. The processor also is operable to associate information from the plurality of documents together in a document collection.

In an embodiment, the processor is operable to, for each of the plurality of documents, create another document that includes the content organized according to the corresponding document schema, and associate the information associating said another documents together. The processor may also be operable to, upon receiving the user selection of the element, provide the user an indication corresponding to the element of how to author the content. Also, the processor may be operable to designate at least one of the plurality of elements as required and validate whether content has been entered for said at least one element. At least two of the schemas may share a common element and at least two of the plurality of documents may correspond to the same document schema.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the domain of creating discursive writing structures, such as help documentation for computer applications, modular writing, and information mapping. However, one with skill in the art will recognize that the invention applies to other areas, such as documentation for any product and documentation creation in general.

In the present invention, writing patterns as a means of helping technical writers create consistent, user-centric documentation, are disclosed. In an embodiment, a writing pattern is a component of an authoring tool that enables authorship of content by soliciting portions of the content and automating the process of assembling the content into a prescribed structure and style. The writing pattern may be embodied in an XML schema or document type definition (DTD) used by the authoring tool. The authoring tool may validate the completeness of the content. These writing patterns are designed to address the typical problems that users might face when using e-business (ERP and CRM) applications. The writing patterns are designed according to common user requirements based on industry best practices. The writing patterns are tested for usability, and they are applied using an authoring tool that ensures consistent presentation and validates completeness.

Figure 2:
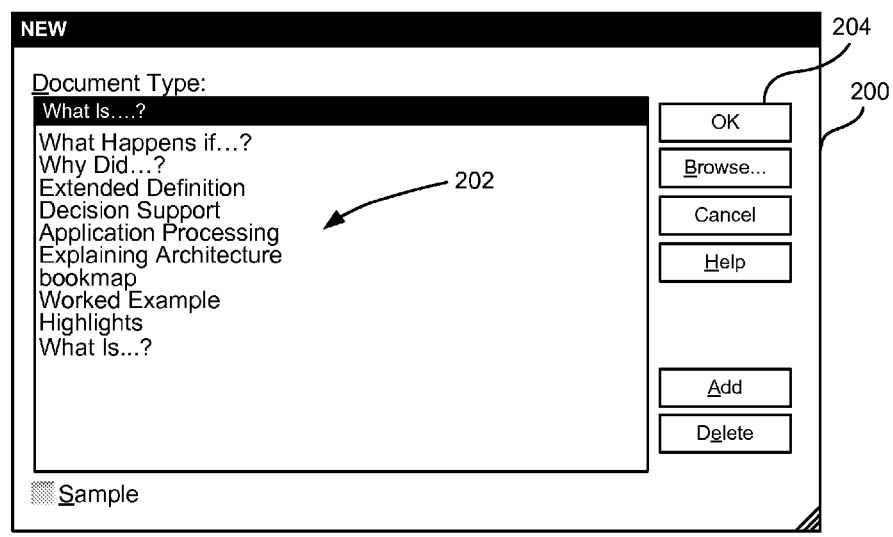
FIG. 2 is an element of an example interface used to select a writing pattern, in accordance with an embodiment.

The writing patterns, when used within an authoring tool, provide clear guides for technical writers to use during the planning and authoring process. In an embodiment, technical writers choose from among several patterns. FIG. 2 shows an illustrative example dialogue box 200 which may appear in connection with the authoring tool. The dialog box 200 may, for instance, appear responsive to user input indicative of an intention to select a writing pattern. As shown in the drawing, the dialog box includes a list 202 of descriptive phrases that indicate a topic for each writing pattern. Examples listed include a "What Happens if . . . ?" writing pattern, a "Why did . . . ?" writing pattern and others. In an embodiment, a user of the authoring tool would select one of the writing patterns listed and then select an OK button 204. As a result, the authoring tool may cause the display of information corresponding to the selected writing pattern. An example of such a display is provided in FIG. 3, discussed below.

Each writing pattern may be associated with one of several distinct topic types, such as frequently asked questions (FAQs) (which answer business-use and system-constraint questions about a task or function), conceptual information (for example, information needed to make critical choices about an application's configuration), examples (for example, how to achieve a specific result), and a glossary type (which provides definitions of both application-specific words and phrases and common business terms that have specific meaning in an application). Writing pattern descriptions, diagrams of their various components, and examples of the patterns in use may be provided to help technical writers choose the most appropriate pattern for each situation.

In an embodiment, writers apply the patterns using an authoring tool that automates the process of producing the prescribed pattern style and that validates its completeness as documentation created with writing patterns. For example, in an embodiment, a writer uses an interface of an authoring tool to select an applicable writing pattern that corresponds to the content to be authored by the writer. For example, a Frequently Asked Questions (FAQ) writing pattern corresponds to content that includes a question and an answer to the question.

Figure 3:
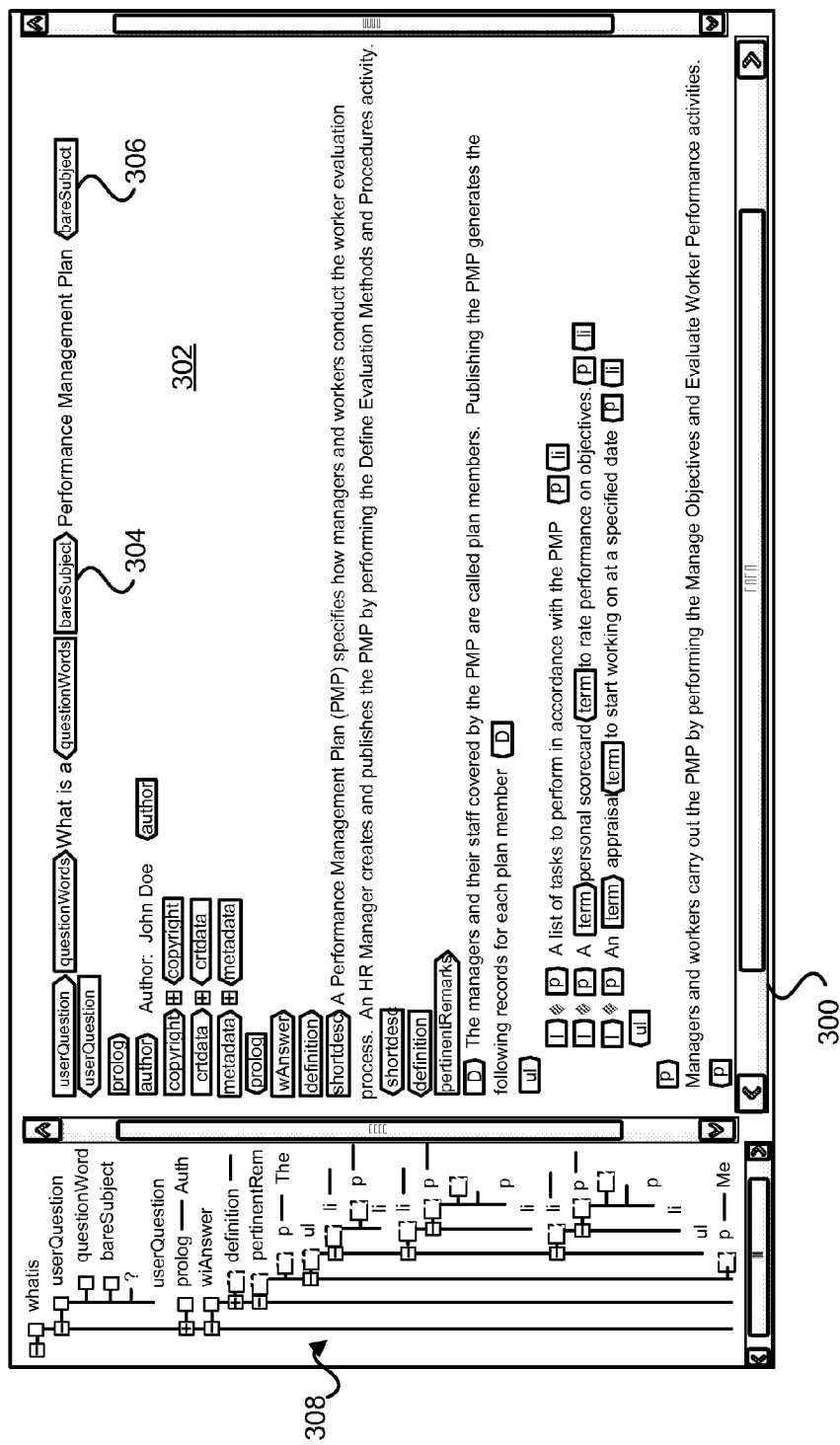
FIG. 3 is an example interface from which the element of FIG. 2 may appear, in accordance with an embodiment.

As noted, FIG. 3 shows an example interface page 300 of an authoring tool, in accordance with an embodiment. In the particular example shown, the interface page 300 may have appeared in response of user input indicative of selection of a "What is . . . ?" writing pattern. As shown in the example of the figure, the interface page 300 includes a content pane 302 in which information related to the selected writing pattern appears. In particular, in this example, a visual representation of a schema that implements the selected writing pattern appears in the authoring tool. The visual representation of the schema, in this example, includes a plurality graphic pairs, where each pair includes an opening graphic and a closing graphic. For example, as shown, the selected "What is . . . ?" writing pattern includes a beginning "bareSubject" graphic 304 and a closing "bareSubject" graphic 306. In an embodiment, the graphic sets indicate a portion of content associated with the selected writing pattern and the first of a graphic pair indicates a beginning of the portion and the second of the graphic pair indicates an end of the portion. As shown, there may be content between the graphics of a graphic pair. Such content may be pre-populated or may be added and/or modified by a user using the authoring tool. For example, a user may position a cursor inside of a graphic pair and use a keyboard to type content.

Users may also access components of a writing pattern to author corresponding content in other ways. For instance, as shown in FIG. 3, the interface page 300 includes a pattern pane 308 in which the various components of the selected writing pattern are shown. A user may, for instance, select one of the components in the pattern pane and a cursor may responsively appear in the appropriate position in the document pane 302. In an embodiment, the components of the selected writing pattern are shown as an indented hierarchical tree where names of the components are arranged according to their relationship in the writing pattern, which may be encoded in an XML schema or DTD, as described below. As shown, levels of the tree may be expanded and/or collapsed in response to user input.

In an embodiment, the graphic pairs correspond to XML elements of an XML schema corresponding to the writing pattern. Also, as shown in the example, the graphic pairs are arranged in the content pane 302 according to the XML schema. Specifically, the vertical and horizontal positions of the beginning graphics of graphic pairs relative to one another appear in a manner representative of the order and/or relationships of corresponding XML elements. For example, if one element is a sub-element of another element, then the beginning graphic of a graphic pair corresponding to the one element would be shown as indented relative to the beginning graphic of another graphic pair corresponding to the other element. In this manner, the content pane shows a representation of how content of a topic corresponding to a writing pattern should be structured.

Writing patterns may exist for sub-categories of content as well. For example, as discussed above, an FAQ writing pattern may correspond generally to content that has a question and an answer. There are, however, many specific types of questions that are often used and a writing pattern may exist for one or more of these specific types of questions. For instance, there may be a writing pattern created for questions phrased in a common way, such as "What is a . . . "; "What happens if . . . "; and "How do I . . . ".

As discussed above, a writing pattern is a component of an authorship tool that solicits specific portions of content to be assembled into a structured form with a particular style defined by the writing pattern. The authorship tool may present several different writing patterns to a writer for selection. The selected writing pattern includes one or more components, each of which may include one or more sub-components. Unless otherwise clear from context, the term "component" includes "sub-component." In an embodiment, each component is one of a plurality of types, where each type represents the type of information solicited and which may correspond to a specific portion of a document. In order to specify the type of information the writer intends to author, the writer selects one of the components and enters appropriate text (or other appropriate content, such as image, audio, and/or video content) depending on the type of the selected component.

Pre-authored content may be presented to the writer upon selection of the component, or at another time, such as when the writing pattern is selected by the writer. As an example, if a writer wishes to write a document explaining to implementers how the different components or processes of a software business application relate to each other so that they can best tailor the application's functionality to meet the business needs of the user of the application, the writer may select a writing pattern entitled "Explaining Architecture." The "Explaining Architecture" writing pattern, which is associated with a corresponding explaining Architecture schema, includes components entitled "formulaicTitle," "introduceStructure," and "onePieceOfPuzzle." Upon selecting the "Explaining Architecture" writing pattern, and, therefore, the Explaining Architecture schema associated with the Explaining Architecture pattern, the authoring tool displays the components of the writing pattern for selection by the writer. If, for example, the writer selects the formulaicTitle component, the writer may be allowed to insert text at the beginning of the title sentence "Components: How They Work Together" in order to create a title for the document, such as "Checklist Components: How They Work Together" The writer may be able to edit pre-authored text as necessary, for example, to ensure proper grammar or otherwise control the content as a whole. For instance, the writer may choose to change the title to reflect a different use case, namely how one named feature works with other features, by adding the name of such features to the title sentence "<main feature: How It/They Works With <other features>, while changing the singular or plural of the noun accordingly. For example, the writer may edit the title sentence so that it reads "Goals: How They Work With Profiles and Performance Documents." The writer may proceed to select one or more of the remaining components to provide relevant text. The introduceStructure component may be selected to describe the application's individual components and how they fit together in a single paragraph. A diagram component may allow the writer to illustrate this description by way of including an image of the concept. A plurality of components named onePieceOfPuzzle may allow the writer to identify each feature by name, and discuss the properties of the feature and how it relates to other features, doing so within the content of the required business needs of the reader of the documentation.

In an embodiment, a content created using a writing pattern may be encoded using a suitable markup language, such as XML. Further, the writing pattern itself may be defined using a suitable markup language. For example, the following is from an XML schema for a writing pattern associated with a What's The Difference? writing pattern used to guide a writer writing a document directed to explaining the difference between two items, such as between two functions of an application. The schema for this pattern is called whatsTheDifference:

```
<?xml version="1.0" encoding="UTF-8"?>
<!-- Copyright Oracle 2008 -->
<xs:schema xmlns:xs="http://www.w3.org/2001/XMLSchema"
elementFormDefault="qualified" attributeFormDefault="unqualified">
        <!-- ================ TOPIC DOMAINS INCLUSION =================== -->
        <xs:include schemaLocation="../fusion/conceptBase.xsd" />
        <xs:include schemaLocation="../fusion/OracleMod.xsd" />
        <xs:element name="whatsTheDifference" type="whatsTheDifference.class" >
            <xs:annotation>
                <xs:documentation>
                </xs:documentation>
            </xs:annotation>
        </xs:element>
        <xs:element name="wtdAnswer" type="wtdAnswer.class" >
            <xs:annotation>
                <xs:documentation>
                </xs:documentation>
            </xs:annotation>
        </xs:element>
        <xs:complexType name="whatsTheDifference.class">
                <xs:sequence>
                    <xs:element ref="userQuestion"/>
                    <xs:element ref="prolog"/>
                    <xs:element ref="wtdAnswer"/>
                    <xs:element ref="related-links" minOccurs="0"/>
                </xs:sequence>
                <xs:attribute name="id" type="xs:ID" />
                <xs:attribute name="conref" type="xs:string"/>
                <xs:attributeGroup ref="Oracle-atts"/>
                <xs:attribute ref="class" default="- topic/topic concept/concept faq/faq
whatsTheDifference/whatsTheDifference "/>
        </xs:complexType>
        <xs:complexType name="wtdAnswer.class">
                <xs:sequence>
                    <xs:element ref="mainDifference"/>
                    <xs:element ref="otherDifference" minOccurs="0" maxOccurs="7"/>
                    <xs:element ref="noDifference" minOccurs="0"/>
                </xs:sequence>
                <xs:attributeGroup ref="id-atts"/>
            <xs:attributeGroup ref="localization-atts"/>
                <xs:attributeGroup ref="global-atts"/>
                <xs:attribute ref="class" default="- topic/body concept/conbody faq/answer
whatsTheDifference/wtdAnswer "/>
        </xs:complexType>
        <xs:element name="mainDifference" type="mainDifference.class">
                <xs:annotation>
                    <xs:documentation>
                    </xs:documentation>
```

```
                </xs:annotation>
        </xs:element>
        <xs:complexType name="mainDifference.class">
        <xs:sequence>
                <xs:element ref="point"/>
                <xs:element ref="counterpoint"/>
        </xs:sequence>
                <xs:attributeGroup ref="univ-atts"/>
                <xs:attribute ref="class" default="- topic/abstract whatsTheDifference/mainDifference " />
        </xs:complexType>
        <xs:element name="point" type="point.class">
                        <xs:annotation>
                                <xs:documentation>
                                </xs:documentation>
                        </xs:annotation>
        </xs:element>
        <xs:complexType name="point.class">
        <xs:sequence>
                <xs:element ref="shortdesc"/>
                        <xs:choice minOccurs="0" maxOccurs="2">
                                <xs:group ref="section.cnt"/>
                        </xs:choice>
        </xs:sequence>
                <xs:attributeGroup ref="univ-atts"/>
                <xs:attribute ref="class" default="- topic/abstract whatsTheDifference/point " />
        </xs:complexType>
        <xs:element name="counterpoint" type="counterpoint.class">
                        <xs:annotation>
                                <xs:documentation>
                                </xs:documentation>
                        </xs:annotation>
        </xs:element>
        <xs:complexType name="counterpoint.class">
        <xs:sequence>
                <xs:element ref="shortdesc"/>
                        <xs:choice minOccurs="0" maxOccurs="2">
                                <xs:group ref="section.cnt"/>
                        </xs:choice>
        </xs:sequence>
                <xs:attributeGroup ref="univ-atts"/>
                <xs:attribute ref="class" default="- topic/abstract whatsTheDifference/counterpoint " />
        </xs:complexType>
        <xs:element name="otherDifference" type="otherDifference.class">
                        <xs:annotation>
                                <xs:documentation>
                                </xs:documentation>
                        </xs:annotation>
        </xs:element>
        <xs:complexType name="otherDifference.class">
        <xs:sequence>
                <xs:element ref="otherPoint"/>
                <xs:element ref="otherCounterpoint"/>
        </xs:sequence>
                <xs:attributeGroup ref="univ-atts"/>
                <xs:attribute ref="class" default="- topic/abstract whatsTheDifference/otherDifference " />
        </xs:complexType>
        <xs:element name="otherPoint" type="otherPoint.class">
                        <xs:annotation>
                                <xs:documentation>
                                </xs:documentation>
                        </xs:annotation>
        </xs:element>
        <xs:complexType name="otherPoint.class">
        <xs:sequence>
                <xs:element ref="p"/>
                        <xs:choice minOccurs="0" maxOccurs="2">
                                <xs:group ref="section.cnt"/>
                        </xs:choice>
        </xs:sequence>
                <xs:attributeGroup ref="univ-atts"/>
                <xs:attribute ref="class" default="- topic/abstract whatsTheDifference/otherPoint " />
        </xs:complexType>
        <xs:element name="otherCounterpoint" type="otherCounterpoint.class">
                        <xs:annotation>
                                <xs:documentation>
                                </xs:documentation>
                        </xs:annotation>
        </xs:element>
        <xs:complexType name="otherCounterpoint.class">
        <xs:sequence>
```

```
            <xs:element ref="p"/>
            <xs:choice minOccurs="0" maxOccurs="2">
                <xs:group ref="section.cnt"/>
            </xs:choice>
    </xs:sequence>
        <xs:attributeGroup ref="univ-atts"/>
        <xs:attribute ref="class" default="- topic/abstract whatsTheDifference/otherCounterpoint " />
    </xs:complexType>
    <xs:element name="noDifference" type="noDifference.class">
            <xs:annotation>
                    <xs:documentation>
                    </xs:documentation>
            </xs:annotation>
    </xs:element>
    <xs:complexType name="noDifference.class">
    <xs:sequence>
            <xs:element ref="p"/>
            <xs:choice minOccurs="0" maxOccurs="2">
                <xs:group ref="section.cnt"/>
            </xs:choice>
    </xs:sequence>
        <xs:attributeGroup ref="univ-atts"/>
        <xs:attribute ref="class" default="- topic/abstract whatsTheDifference/noDifference " />
    </xs:complexType>
</xs:schema>
```

As can be seen from the above, the XML schema define several components of a What's The Difference? writing pattern. For purposes of illustration, a simplified XML schema for the What's The Difference? writing pattern that does not call in other schemas appears below.

```
            <?xml version="1.0" encoding="UTF8" ?>
        <!
    Generated by Turbo XML 2.4.1.100. Conforms to w3c http://www.w3.org/2001/XMLSchema
        >
<xsd:schema xmlns:xsd="http://www.w3.org/2001/XMLSchema" elementFormDefault="qualified">
<xsd:element name="whatsTheDifference">
<xsd:complexType>
<xsd:sequence>
    <xsd:element ref="userQuestion" />
    <xsd:element ref="mainDifference" />
    <xsd:element ref="otherDifference" minOccurs="0" maxOccurs="7" />
    <xsd:element ref="noDifference" minOccurs="0" />
            </xsd:sequence>
            </xsd:complexType>
            </xsd:element>
<xsd:element name="userQuestion">
    <xsd:complexType />
            </xsd:element>
<xsd:element name="mainDifference">
<xsd:complexType>
<xsd:sequence>
<xsd:element ref="point" />
    <xsd:element ref="counterpoint" />
            </xsd:sequence>
            </xsd:complexType>
            </xsd:element>
<xsd:element name="otherDifference">
<xsd:complexType>
<xsd:sequence>
    <xsd:element ref="otherPoint" />
    <xsd:element ref="otherCounterpoint" />
            </xsd:sequence>
            </xsd:complexType>
            </xsd:element>
<xsd:element name="point">
    <xsd:complexType />
            </xsd:element>
<xsd:element name="counterpoint">
    <xsd:complexType />
            </xsd:element>
<xsd:element name="noDifference">
<xsd:complexType>
    <xsd:sequence />
```

```
            </xsd:complexType>
        </xsd:element>
<xsd:element name="otherPoint">
<xsd:complexType>
    <xsd:sequence />
            </xsd:complexType>
        </xsd:element>
<xsd:element name="otherCounterpoint">
<xsd:complexType>
    <xsd:sequence />
            </xsd:complexType>
        </xsd:element>
        </xsd:schema>
```

As can be seen from the above simplified schema, the schema for a What's The Difference? writing pattern includes a sequence of components, specifically, a userQuestion component, a mainDifference component, an otherDifference component, and a noDifference component, where each component corresponds to a similarly-named XML element. In addition, some of the components themselves define a sequence of subcomponents. For instance, the mainDifference component includes a point component and a counterpoint component.

In an embodiment, when a writer selects a component of the writing pattern (such as by clicking on the component in an interface of an authoring tool that incorporates the writing pattern) and enters and/or edits text into the component (such as through the interface), the corresponding XML element is modified accordingly. For instance, if a user selected the userQuestion component of the writing pattern and entered "What's the difference between . . . " the corresponding text may be inserted into the above XML schema in the userQuestion element.

Also, in an embodiment, at a point in time, such as when a writer has indicated that he or she has completed entry of content, an appropriate application adapted to verify or otherwise process the XML may be utilized in order to determine whether the writer has authored text for (or otherwise manipulated) all necessary components and, if necessary, prompt the writer to include additional text. Whether a component requires text from the writer may be encoded in the XML schema for the writing pattern. Further, in an embodiment, an XML document created utilizing a writing pattern is processed and converted into another form, such as into an HTML document that includes instructions for presenting the content of the document in a suitable manner and/or a Portable Document Format (PDF) document presenting the content of the document in a suitable manner.

Documentation created using writing patterns may be included as documentation, such as help documentation, with corresponding applications. In an embodiment, documentation is included as online help documents for an application whereby a user of the application performs a search for relevant terms within help documentation provided for the application. The documentation, for example, may comprise one or more HTML or other files, each file corresponding to a particular topic. Documents may be indexed and searched at the direction of a user using the application. Documentation may also be embedded into an application so that appropriate documentation is readily accessible to the user during use of the application. As an example, a hyperlink to an appropriate document explaining what type of input should be entered into a particular field may be placed in a user interface next to the field. In this manner, a user may select the hyperlink in order to view the document. Similarly, a hyperlink to a document explaining what a specific function of an application does may be placed next to a user interface element that executes the function when selected. Documentation created using writing patterns may also be compiled into a single document, such as a PDF document, which may be printed onto paper and included in packaging for an application.

In an embodiment, a component of a writing pattern is associated with information assisting writers in preparing content for the component. For example, in an embodiment, a component of a writing pattern, as presented to a writer, includes a hyperlink to an HTML page that provides guidelines for and/or examples of content for the component. Such information may also be associated with the writing pattern itself so that, for example, the writing pattern includes a hyperlink to an HTML page providing guidelines for and/or examples of content for all or a subset of the components associated with the writing patterns. For example, if a writer using an authoring tool employing an FAQ writing pattern selects a Question component, a hyperlink to guidelines for the Question component may be presented to the user by the authoring tool. By selecting the hyperlink, the authoring tool (or another application, such as a browser) may present information such as a brief explanation of what type of text should be entered and may provide examples.

Generally, writing patterns may be created according to established structures/styles of documentation. For instance, a large software manufacturer may wish to help documentation to be as uniform as possible across a large family of products so that a user familiar with the structure and style of the help documentation for one product will not have trouble with the help documentation of another product. For example, it may be desirable for FAQ documentation for each product to be uniformly presented. As another example, it may be desirable to have whatIsA documentation to have a common structure and style for many products. By using writing patterns, the structure and/or style of the help documentation may be predefined so that authors do not need to worry about structure and/or style, but only relevant content. Writing patterns, therefore, relieve the technical writer of the burden of figuring out how best to style their documentation and instead enable them to focus on developing content and technical writers are no longer left to their own individual devices and best guesses how to address common topics. Because of the established structures, these patterns also enable the technical writers to more easily reuse common information across product families. These patterns ensure a more consistent user experience because similar information is presented in similar formats across product families. In addition, testing of the documentation becomes more systematic because it is much easier to test the different structures to see which ones communicate most effectively to users.

As discussed above, an authoring tool may employ writing patterns through the use of authoring tool templates that reflect the details of each writing pattern. As noted above, templates for writing patterns may be defined by XML schemas. Again, this eliminates more of the guesswork and ensures that technical writers accurately apply these patterns.

Further, an authoring tool that employs writing patterns may categorize writing patterns according to pattern types, where a pattern type may be associated with a particular type of content. For example, FAQs appear frequently in help documentation, but there is much variation among the types of questions that may be part of a set of FAQs. Thus, a writing pattern for each type of commonly-occurring question may be associated with an FAQ pattern type. Thus, if a writer decides that it would be helpful to explain to a user what might happen if the user took a certain action, the writer may use the authoring tool to select a whatHappensIf writing pattern from the FAQ pattern type, which would employ a template (which may be defined by an XML schema for the whatHappensIf writing pattern). When a writer opens the template for this writing pattern, for instance by selecting an element of an interface of the authoring tool corresponding to the whatHappensIf writing pattern, the order of information is apparent based on populated or available elements that are presented to the writer.

As discussed above, for the writer, there is no guessing at the order of presentation. The writer must first begin the topic with a question (also the title) entered using a prescribed format. For example, a writer may use "What happens if <describe choice>?" to author "What happens if I change an entry after it has been processed?" Next, the template prescribes that the writer must enter the downstream consequences of the user's decision. The writer enters this information through the authoring tool interface in a short paragraph, being careful not to repeat the question so that the explanation is as clear and concise as possible. The writer then has the option of entering additional or related consequences, of using graphics, or of adding important notes, lists, or tables. The result is a clear and concise response to a predicted user need worded in a way that is consistent with other such topics. Thus, both the productivity and performance of writing teams and the user experience improves.

The user of documentation created using writing patterns benefits significantly. In an embodiment, writing patterns are based on the user point of view, reflecting why they use the documentation (the problems to which they want a solution) and how (searched for, read-online, or other means). Topics may be available where needs exist but absent when other forms of user help are available (such as an obvious user interface or existing error or warning message). Topics are relevant and are worded clearly, concisely, and consistently. Users can expect the same formats for certain types of topics across product lines and can learn quickly from the consistency.

Thus, the use of writing patterns provides a host of advantages. Writing patterns help technical writers create consistent, user-centric documentation that addresses typical problems that users face when using applications. Writing patterns also provide clear guides for technical writers to use during the planning and authoring process and, therefore, enable technical writers to spend less time on structuring documentation and more time on developing content. Writing patterns, therefore, shorten the learning curve for new writers and provide all writers with a standard against which to measure their work. Writing patterns enable writers to reuse common information across product families, which makes testing of documentation more systematic. This allows for creation of documentation that provides help only where there is a user-defined need for it and ensures a consistent user experience for users of the documentation. Thus, writing patterns allow the same design rigor and methodologies applied to other aspects of human computer interaction to be applied to documentation. Documentation can be designed according to the requirements of the user of the documentation, just like patterns are used to design the user interface. Writing patterns allow documentation to be then tested and refined to meet their ends using established usability research, design, and testing techniques applied to software.

Figure 4:
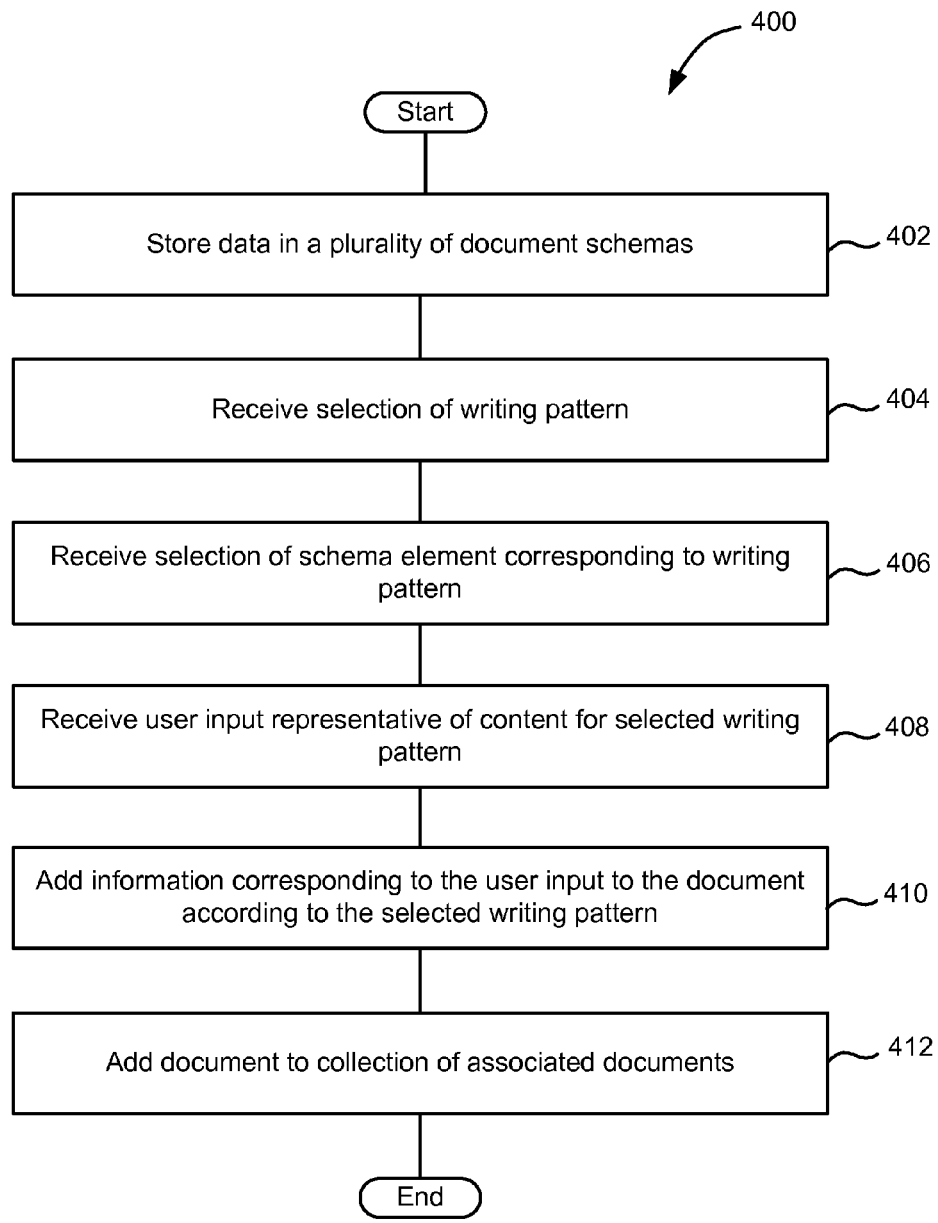
FIG. 4 is a flowchart showing a process for creating documentation in accordance with an embodiment.

FIG. 4 shows an example flowchart of a process 400 for creating content, in accordance with an embodiment. The process 400, or variations thereof, may be performed under the control of one or more computer systems configured with executable instructions. Executable instructions for performing the process 400, or a variation thereof, may be stored as code on a computer-readable storage medium. As shown in the figure, a plurality of document schemas are stored 402 in a data store. In an embodiment, a document schema encodes a writing pattern's organizational structure of content for a document, such as in a manner described above. When a user is ready to author content, the user's selection of a writing pattern may be received 404. Selection of the writing pattern may, for instance, be accomplished through an interface, such as the interface shown in FIG. 2. Once the selection of the writing pattern is received, a visual representation of the writing pattern may be displayed to the user, such as a representation having characteristics of those shown in FIG. 3.

Returning to FIG. 4, in an embodiment, user selection of a schema element corresponding to a writing pattern is received 406. Receiving user selection of the schema element may be responsive to user input indicative of user intent to author content for a portion of a document corresponding to the schema element. For instance, a user may place a cursor in an area of a screen display that corresponds to a component of a writing pattern, such as inside of a graphic pair described in connection with FIG. 3, where the component corresponds to a schema element. As another example, a user may select the name or a writing pattern component of a pattern pane similar to the pattern pane shown in FIG. 3. Generally, the user may select a component in any manner that is indicative of the user's intent to author content for a portion of a document corresponding to the component.

In an embodiment, once the selection of the schema element is received, user input representative of content for the selected writing pattern is received 408. User input may be, for example, keystrokes on a keyboard corresponding to text authored by the user. Other examples include generally any use of one or more input devices to indicate any content, such as text, audio, video, and the like, for inclusion into documentation. In an embodiment, once the user input is received, information corresponding to the user input is added 410 to a document according to the selected writing pattern. The document may be an XML document defining a schema according to the writing pattern and adding the information to the document may include adding the information to an instance of the selected element or adding an instance of the element to the document. Adding the information to the document may also include adding the information to a different format document, such as a hypertext markup language (HTML) or other format document in a location determined from the relationship of the selected element to the rest of the schema.

One or more of the above actions may be performed a plurality of times and/or for a plurality of documents. For example, a user authoring content may select and input content for several elements of a single document, for several documents. In one embodiment, the same document is used to create several documents having different, but similarly organized content. Content and selections received from the user may be used to create documents according to corresponding schemas. Accordingly, in an embodiment, a document created in accordance with the above, or variations thereof, may be added 412 to a document collection of associated documents. As an example, documents including one or more documents created using the above may be associated together for a particular product, such as software. The associated documents, for instance, may be files of help documentation for a software application. The documents may be associated together in various manners, such as by being placed in a common document storage location, but being referenced in an index for the documents, by creating a document having hyperlinks to the documents in the document collection, and the like.

Figure 1:
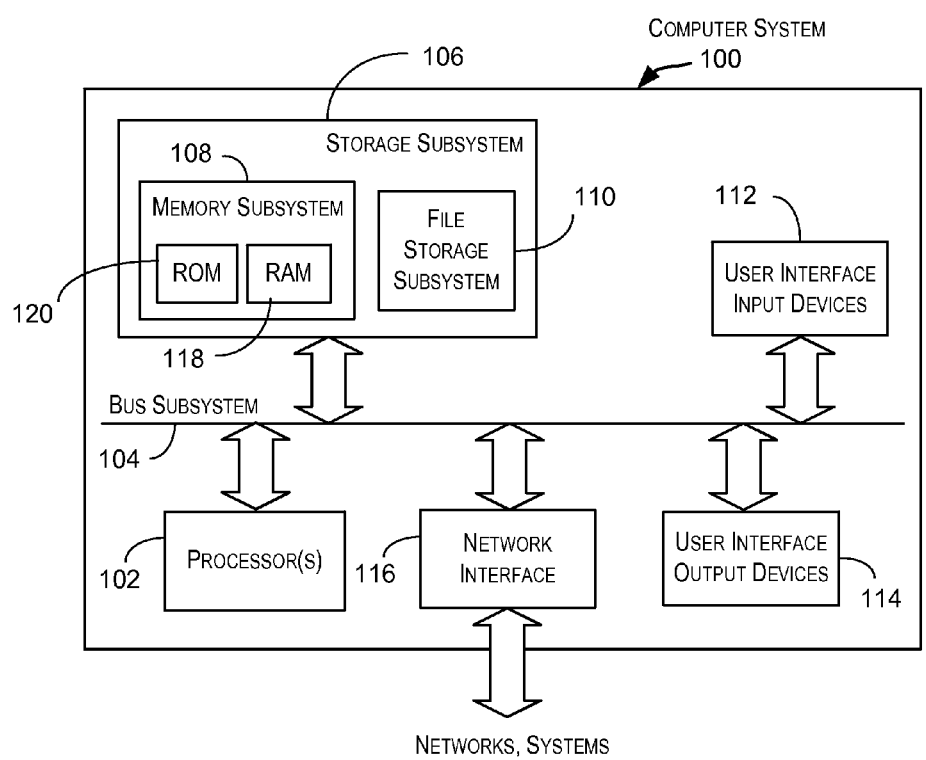
FIG. 1 is a simplified block diagram of a computer system that may be used to practice an embodiment of the present invention.

FIG. 1 is a simplified block diagram of a computer system 100 that may be used to practice an embodiment of the present invention. Computer system 100 may serve as a processing system 102 or a client system 120 depicted in FIG. 1. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to provide a graphical representation of a policy.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. The process of manipulating the graphical objects as well as results of implementing policies may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106.

These software modules or instructions may be executed by processor(s) 102. Storage subsystem 106 may also provide a repository for storing data used in accordance with the present invention, for example, the data stored in the diagnostic data repository. For example, storage subsystem 406 provides a storage medium for persisting documentation created in accordance with various embodiments described herein. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method of creating product documentation, comprising:
    storing in a data store a plurality of document schemas, each of the document schemas corresponding to a writing pattern provided by an authoring tool as a guide for a writer to author at least a portion of a document, each of the document schemas comprising a plurality of elements corresponding to a plurality of components of the writing pattern,
    each writing pattern corresponding to each of the document schemas is associated with several of distinct topic types, the topic types including at least one of questions for answering business-use and system-constraint questions about a task or function, conceptual information, examples of how to achieve a specific result, or definitions of at least one of application-specific words, phrases, or common business terms that have specific meaning, each component of the plurality of components corresponds to at least a portion of a document;

for each document of a plurality of documents:

receiving user selection of a component of a particular writing pattern corresponding to a visual element of a visual representation of a corresponding document schema, the visual representation including a plurality of graphic pairs each having an opening graphic and a closing graphic;

receiving user input representative of content for the selected component corresponding to the selected visual element; and adding information corresponding to the user input to the document according to the corresponding document schema; and associating the added information from the plurality of documents together in a document collection.

2. The computer-implemented method of claim 1, further comprising, for each of the plurality of documents, creating another document that includes the content organized according to the corresponding document schema or DTD, and wherein associating the information includes associating said another documents together.

3. The computer-implemented method of claim 1, further comprising, upon receiving the user selection of the element, providing the user an indication corresponding to the element of how to author the content.

4. The computer-implemented method of claim 1, further comprising:

designating at least one of the plurality of elements as required; and validating whether content has been entered for said at least one element.

5. The computer-implemented method of claim 1, wherein at least two of the schemas share a common element.

6. The computer-implemented method of claim 1, wherein at least two of the plurality of documents correspond to the same document schema.

7. A non-transitory computer-readable storage medium having stored thereon instructions that cause one or more processors to create documentation, the instructions comprising:

instructions that cause the one or more processors to store in a data store a plurality of document schemas, each document schema corresponding to a topic of a writing pattern provided by an authoring tool as a guide for a writer to author at least a portion of a document, each of the document schemas comprising a plurality of elements corresponding to a plurality of components of the writing pattern each writing pattern is associated with several of distinct topic types, the topic types including at least one of questions for answering business-use and system-constraint questions about a task or function, conceptual information, examples of how to achieve a specific result, or definitions of at least one of application-specific words, phrases, or common business terms that have specific meaning, each component of the plurality of components corresponds to at least a portion of a document;

instructions that cause the one or more processors to:

for each document of a plurality of documents:

receive user selection of a component of a particular writing pattern corresponding to a visual element of a visual representation of a corresponding document schema, the visual representation including a plurality of graphic pairs each having an opening graphic and a closing graphic;

receive user input representative of content for the selected component corresponding to the selected visual element; and add information corresponding to the user input to the document according to the corresponding document schema; and instructions that cause the one or more processors to associate the added information from the plurality of documents together in a document collection.

8. The computer readable storage medium of claim 7, wherein the instructions further comprise instructions that cause the one or more processors to, for each of the plurality of documents, create another document that includes the content organized according to the corresponding document schema, and wherein the instructions that cause the one or more processors to associate the information include instructions that cause the one or more processors to associate said another documents together.

9. The computer readable storage medium of claim 7, further comprising instructions that cause the one or more processors to, upon receiving the user selection of the element, provide the user an indication corresponding to the element of how to author the content.

10. The computer readable storage medium of claim 7, further comprising: instructions that cause the one or more processors to designate at least one of the plurality of elements as required; and instructions that cause the one or more processors to validate whether content has been entered for said at least one element.

11. The computer readable storage medium of claim 7, wherein the document schemas are schemas of a markup language.

12. The computer readable storage medium of claim 7, wherein the instructions that cause the one or more processors to associate the information include instructions that cause the one or more processors to collect a plurality of hyperlinks to corresponding documents of the document collection.

13. The computer readable storage medium of claim 7, wherein at least two of the schemas share a common element.

14. The computer readable storage medium of claim 7, wherein at least two of the plurality of documents correspond to the same document schema.

15. A system for creating documentation, comprising:

a memory storage device operable to store in a data store a plurality of document schemas, each document schema corresponding to a topic of a writing pattern provided by an authoring tool as a guide for a writer to author at least a portion of a document, each of the document schemas comprising a plurality of elements corresponding to a plurality of components of the writing pattern, each writing pattern corresponding to each of the document schemas is associated with several of distinct topic types, the topic types including at least one of questions for answering business-use and system-constraint questions about a task or function, conceptual information, examples of how to achieve a specific result, or definitions of at least one of application-specific words, phrases, or common business terms that have specific meaning, each component of the plurality of components corresponds to at least a portion of a document;

at least one input device; and at least one processor operable to:

for each of a plurality of documents:

receive user selection of a component of a particular writing pattern corresponding to a visual element of a visual representation of a corresponding document schema, the visual representation including a plurality of graphic pairs each having an opening graphic and a closing graphic;

receive user input representative of content for the selected visual component corresponding to the selected element; and add information corresponding to the user input to the document according to the corresponding document schema; and associate the added information from the plurality of documents together in a document collection.

16. The system of claim 15, wherein said at least one processor is operable to, for each of the plurality of documents, create another document that includes the content organized according to the corresponding document schema, and wherein said at least one processor is operable to associate the information associating said another documents together.

17. The system of claim 15, said at least one processor is operable to, upon receiving the user selection of the element, provide the user an indication corresponding to the element of how to author the content.

18. The system of claim 15, wherein said at least one processor is operable to: designate at least one of the plurality of elements as required; and validate whether content has been entered for said at least one element.

19. The system of claim 15, wherein at least two of the schemas share a common element.

20. The system of claim 15, wherein at least two of the plurality of documents correspond to the same document schema.

* * * * *

UNITED STATES PATENT AND TRADEMARK OFFICE
CERTIFICATE OF CORRECTION

PATENT NO. : 8,762,827 B2  
APPLICATION NO. : 12/820609  
DATED : June 24, 2014  
INVENTOR(S) : Spradley et al.

Page 1 of 1

It is certified that error appears in the above-identified patent and that said Letters Patent is hereby corrected as shown below:

Title page,

Column 1, item [75] under Inventors, line 3, delete "Garido" and insert -- Garrido --, therefor.

Column 2, item [57] under Abstract, line 9, after "structure and" delete "style".

In the Claims,

Column 22, line 8, in Claim 17, before "said" insert -- wherein --.

Signed and Sealed this  
Third Day of March, 2015

Michelle K. Lee  
*Deputy Director of the United States Patent and Trademark Office*